US011999075B2

(12) United States Patent
    Akarapu et al.

(10) Patent No.: US 11,999,075 B2
(45) Date of Patent: Jun. 4, 2024

(54) SYSTEMS AND METHODS FOR REDUCING SURFACE OIL STREAKS ON WET EXTRUDATE BY IRRADIATION

(71) Applicant: CORNING INCORPORATED, Corning, NY (US)

(72) Inventors: Ravindra Kumar Akarapu, Horseheads, NY (US); Amit Halder, Durham, NC (US); Xinghua Li, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 303 days.

(21) Appl. No.: 17/634,804

(22) PCT Filed: Aug. 7, 2020

(86) PCT No.: PCT/US2020/045343
    § 371 (c)(1),
    (2) Date: Feb. 11, 2022

(87) PCT Pub. No.: WO2021/030176
    PCT Pub. Date: Feb. 18, 2021

(65) Prior Publication Data
    US 2022/0332013 A1    Oct. 20, 2022

Related U.S. Application Data

(60) Provisional application No. 62/886,601, filed on Aug. 14, 2019.

(51) Int. Cl.
    *B28B 11/22* (2006.01)
    *B01J 19/12* (2006.01)
    (Continued)

(52) U.S. Cl.
    CPC ............ *B28B 11/243* (2013.01); *B01J 19/128* (2013.01); *B08B 7/0035* (2013.01); *B08B 7/005* (2013.01);
    (Continued)

(58) Field of Classification Search
    CPC ...... B01J 19/128; B08B 7/0035; B08B 7/005; B28B 2003/203; B28B 3/269;
    (Continued)

(56) References Cited

U.S. PATENT DOCUMENTS 4,463,833 A   8/1984   Ludwig et al.
4,857,245 A * 8/1989   Oshima .................. B28B 13/04
                                          264/492 X (Continued)

FOREIGN PATENT DOCUMENTS

CN    1730431 A    2/2006
CN    101032832 B  4/2013
(Continued)

OTHER PUBLICATIONS

International Search Report and Written Opinion of the International Searching Authority; PCT/US2020/045343; dated Dec. 1, 2020; pp. 11; European Patent Office.

*Primary Examiner* — Leo B Tentoni
(74) *Attorney, Agent, or Firm* — Russell S. Magaziner

(57) ABSTRACT

An extrusion system (100) includes at least one sensor (102, 104) to detect localized presence of oil (701) on an exterior surface (715) or skin of wet extrudate material (714 e.g., ceramic material having a honeycomb cross-sectional shape), and at least one infrared emitting device (106, 108) configured to impinge infrared emissions on at least a portion of the exterior surface responsive to one or more sensor signals. Localized impingement of infrared emissions may reduce presence of oil streaks (701) without undue (Continued)

differential drying of the extrudate skin (715), and avoid surface fissures that would otherwise result in fired ceramic bodies. Separately controllable infrared emitters (502), or at least one controllable infrared blocking or redirecting element (603), may be used to impinge infrared emissions on selected areas. A humidification section (120) arranged downstream of infrared emitters (106, 108) may be used to at least partially rehydrate the wet extrudate material, if necessary.

21 Claims, 13 Drawing Sheets

(51) Int. Cl.
| | |
|---|---|
| B08B 7/00 | (2006.01) |
| B28B 3/26 | (2006.01) |
| B28B 11/24 | (2006.01) |
| B28B 17/00 | (2006.01) |
| B29C 48/11 | (2019.01) |
| B29C 48/92 | (2019.01) |
| B29C 71/00 | (2006.01) |
| B29C 71/04 | (2006.01) |
| C04B 41/00 | (2006.01) |
| F26B 3/30 | (2006.01) |
| B28B 3/20 | (2006.01) |
| B29C 35/08 | (2006.01) |
| B29L 31/60 | (2006.01) |

(52) U.S. Cl.
CPC .......... *B28B 3/269* (2013.01); *B28B 17/0072* (2013.01); *B28B 17/0081* (2013.01); *C04B 41/0045* (2013.01); *B28B 2003/203* (2013.01); *B29C 2035/0822* (2013.01); *B29L 2031/608* (2013.01); *C04B 2235/6021* (2013.01); *F26B 2210/02* (2013.01)

(58) Field of Classification Search
CPC ............ B28B 11/22; B28B 17/0081; B29C 2035/0822; B29C 48/11; B29C 48/92; B29C 71/00; B29C 71/04; B29L 2031/608; C04B 38/006; C04B 41/0045; C04B 2235/6021; F26B 3/30; F26B 2210/02

USPC ...... 264/177.11, 177.12, 232, 406, 407, 408, 264/430, 492; 425/135, 143, 174.4, 445, 425/461; 34/266, 549; 134/1; 250/492.1
See application file for complete search history.

(56) References Cited

U.S. PATENT DOCUMENTS

| | | |
|---|---|---|
| 5,820,945 A | 10/1998 | Wei et al. |
| 5,946,817 A | 9/1999 | Sato |
| 6,932,932 B2 | 8/2005 | Miura et al. |
| 8,038,430 B2 | 10/2011 | Swanson et al. |
| 8,158,202 B2 | 4/2012 | Ichikawa |
| 8,696,962 B2 | 4/2014 | Chou |
| 9,789,633 B2 | 10/2017 | Akarapu et al. |
| 9,833,927 B2 | 12/2017 | Chapman et al. |
| 9,931,763 B2 | 4/2018 | Gordon, III et al. |
| 9,957,200 B2 | 5/2018 | Beall et al. |
| 2003/0098530 A1 | 5/2003 | Inoguchi |
| 2003/0102602 A1 | 6/2003 | Miura |
| 2005/0106356 A1 | 5/2005 | Ikeshima |
| 2007/0090577 A1 | 4/2007 | Chou |
| 2008/0258348 A1 | 10/2008 | Feldman et al. |
| 2009/0317506 A1* | 12/2009 | Adriansens ............... A61L 2/10 250/492.1 X |
| 2012/0086153 A1 | 4/2012 | Kudo et al. |
| 2014/0151915 A1 | 6/2014 | Sariego et al. |

FOREIGN PATENT DOCUMENTS

| | | |
|---|---|---|
| EP | 2079571 B1 | 12/2015 |
| JP | 05-085472 B2 | 12/1993 |
| JP | 06-063792 A | 3/1994 |
| JP | 2003-277155 A | 10/2003 |
| JP | 2005-112679 A | 4/2005 |
| JP | 2007-331234 A | 12/2007 |
| JP | 2008-110537 A | 5/2008 |
| JP | 2008-168464 A | 7/2008 |
| JP | 5854729 B2 | 2/2016 |
| KR | 10-2002-0056197 A | 7/2002 |
| WO | 2007/148764 A1 | 12/2007 |
| WO | 2017/214251 A1 | 12/2017 |
| WO | 2018/013753 A1 | 1/2018 |
| WO | 2018/027006 A1 | 2/2018 |

* cited by examiner

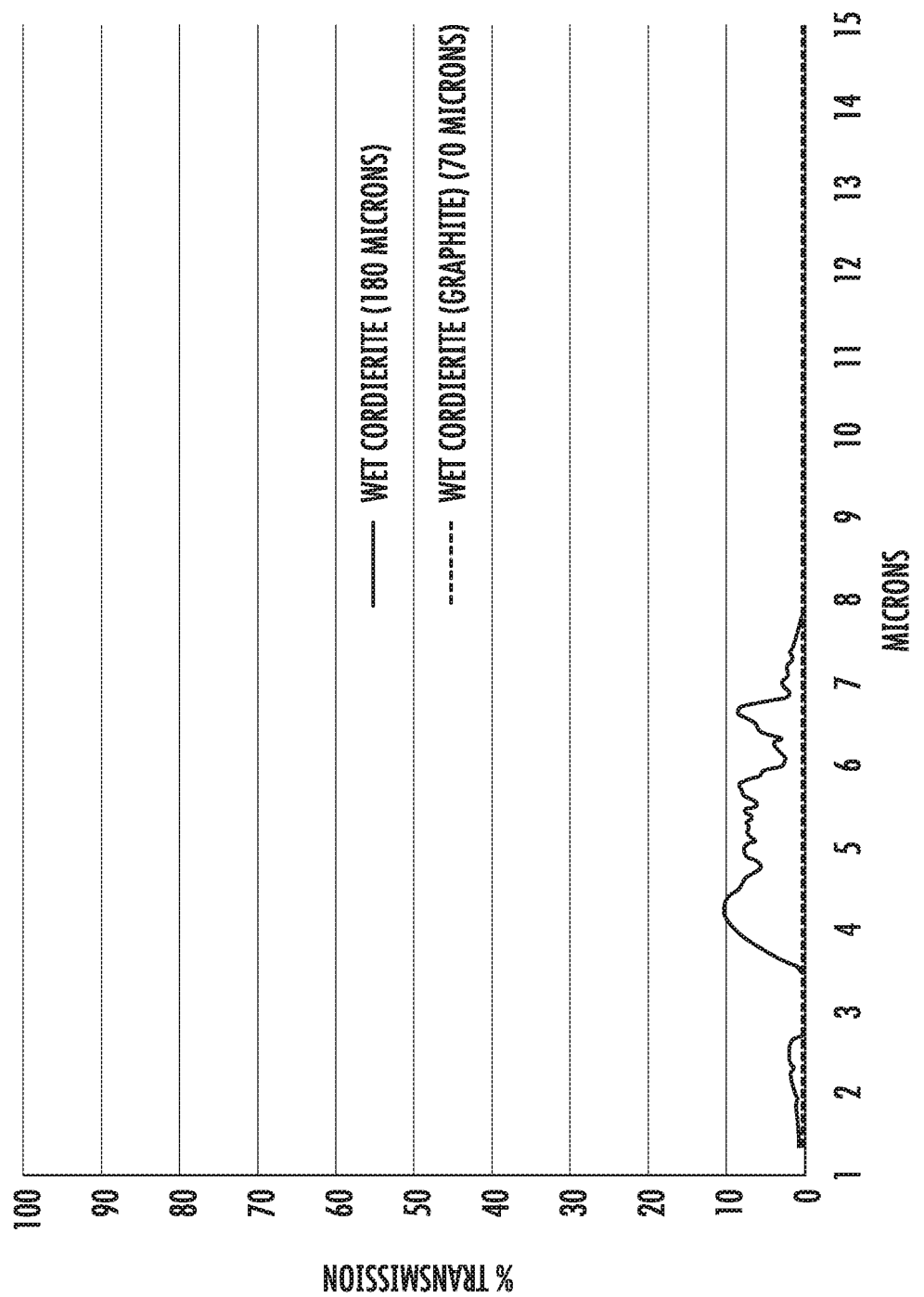

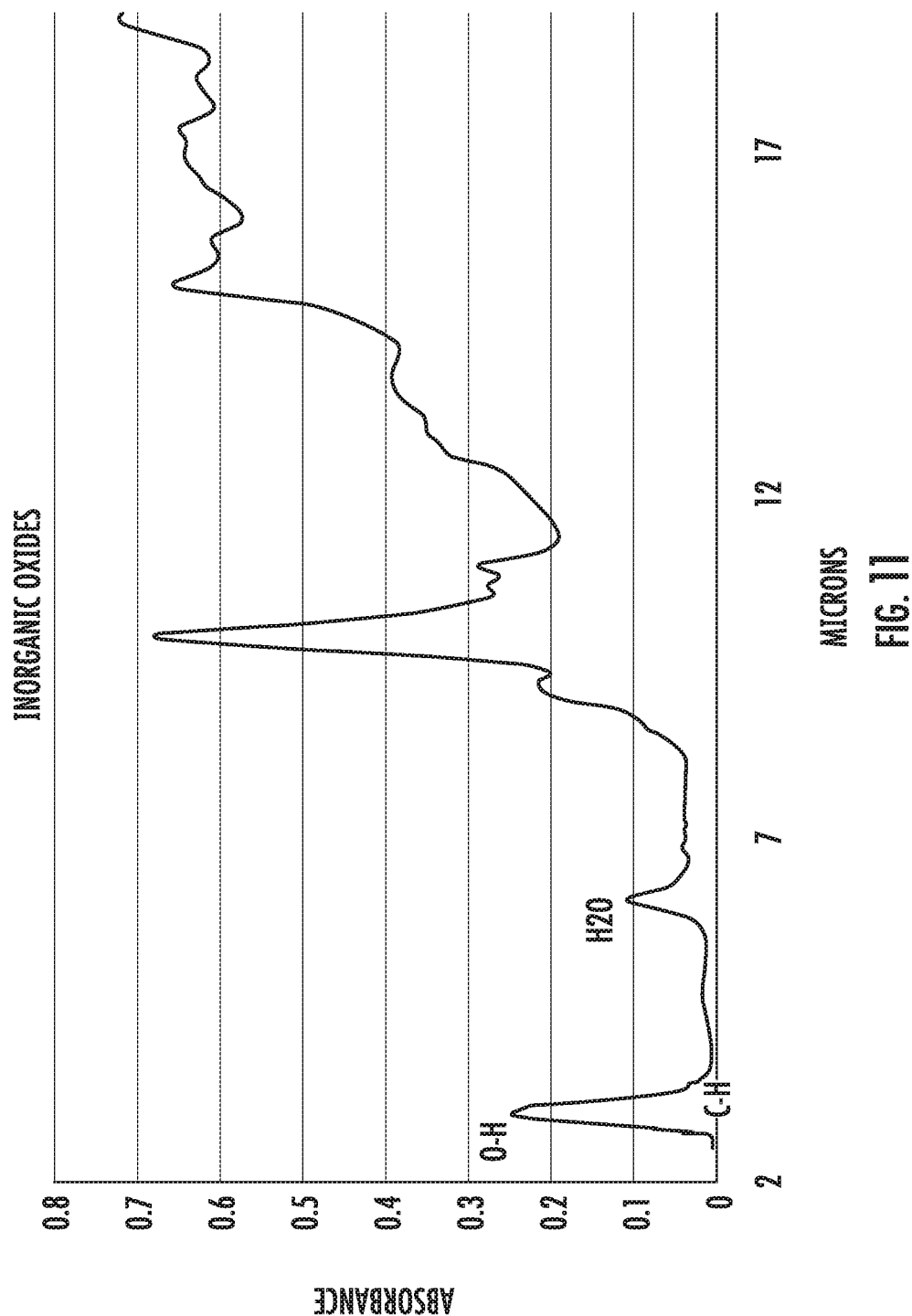

SYSTEMS AND METHODS FOR REDUCING SURFACE OIL STREAKS ON WET EXTRUDATE BY IRRADIATION

CROSS REFERENCE TO RELATED APPLICATIONS

This is a national stage application under 35 U.S.C. § 371 of International Application No. PCT/US2020/045343, filed on Aug. 7, 2020, which claims the benefit of priority under 35 U.S.C § 120 of U.S. Provisional Application Ser. No. 62/886,601 filed on Aug. 14, 2019, the content of which is relied upon and incorporated herein by reference in their entireties.

BACKGROUND

The disclosure relates to extrudate production, and more particularly to systems and methods for reducing presence of surface oil streaks on wet extrudate by localized irradiation.

Ceramic bodies produced by extrusion are used in a wide variety of applications, such as substrates for automotive exhaust catalytic converters, particulate traps within diesel and gasoline engines, chemical filtration processes, and the like. Ceramic bodies having honeycomb cross-sectional shapes are frequently employed to provide a large filtration and/or catalytic surface area within a relatively small overall volume. The manufacturing process for extruded ceramic bodies typically includes producing wet extrudate of desired shape and dimensions using an extrusion apparatus, cutting the extrudate into sections, and transferring the cut sections to a kiln for firing to produce a dry fired body (e.g., aluminum titanate, cordierite, other silica compositions, etc.).

Oils may be provided as a constituent of ceramic-containing wet extrudate material to serve as a lubricant as the extrudate material is forced through an extrusion die, particularly when high die and extrudate surface areas are involved. Under certain conditions, oil streaks may appear on exterior skin portions of wet extrudate received from an extrusion die, with such streaks being localized at one or more regions of an exterior skin.

Although attempts have been made to prevent fissure formation by absorptive removal of oil streaks from wet extrudate material using porous sponge material, providing a sponge in contact with wet extrudate material tends to introduce unacceptable surface defects in the extrudate skin.

Fissures and/or surface defects present in ceramic bodies produced by extrusion may lead to significant production losses.

SUMMARY

Systems and methods disclosed herein utilize infrared emissions to remove oil streaks from a surface of wet extrudate material (i.e., as the extrudate material leaves an extrusion die), thereby avoiding cracking problems associated with firing of extruded articles attributable to localized differential drying when streaks are present. An extrusion system according to certain aspects includes at least one sensor arranged to detect localized presence of oil on an exterior surface of wet extrudate material having a honeycomb cross-section received from an outlet of an extrusion die, and at least one infrared emitting device configured to impinge infrared emissions on at least a portion of the exterior surface responsive to at least one sensor output signal. Localized impingement of infrared emissions may reduce presence of oil streaks on the exterior surface (or skin) of wet extrudate, preferably without detrimentally significant differential drying of the extrudate skin. A related method includes forming wet extrudate material having a honeycomb cross-section and an exterior surface using an extrusion die, sensing a property of the exterior surface utilizing at least one sensor and generating one or more sensor output signals indicative of localized presence of oil on the exterior surface, and responsive to the sensor output signal(s), impinging infrared emissions on at least one portion of the exterior surface to reduce presence of oil thereon.

In one aspect, the present disclosure relates to an extrusion system including an extrusion die, at least one sensor, and at least one infrared emitting device positioned downstream of an outlet of the extrusion die. The extrusion die is configured to continuously form wet extrudate material comprising a honeycomb cross-section and an exterior surface, with the exterior surface having oil on less than an entirety of the exterior surface. The at least one sensor is configured to sense a property of the exterior surface indicative of localized presence of oil on the exterior surface, and is configured to generate at least one sensor output signal. The at least one infrared emitting device is positioned downstream of the outlet in a direction of travel of the wet extrudate material, and is configured to impinge infrared emissions on at least one portion of the exterior surface. The at least one infrared emitting device is configured to be operated responsive to the at least one sensor output signal to reduce presence of oil on the exterior surface.

In certain embodiments, the at least one infrared emitting device comprises at least one first infrared emitting device and at least one second infrared emitting device, wherein the at least one second infrared emitting device is positioned downstream of the at least one first infrared emitting device in the direction of travel of the wet extrudate material.

In certain embodiments, the at least one infrared emitting device comprises a plurality of infrared emitting devices distributed around a perimeter of the wet extrudate material. In certain embodiments, the plurality of infrared emitting devices comprises multiple independently controllable infrared emitting devices.

In certain embodiments, each infrared emitting device of the plurality of infrared emitting devices comprises an infrared emitting source and a plurality of optical waveguides configured to transmit infrared emissions from the infrared emitting source toward the exterior surface. In certain embodiments, the plurality of infrared emitting devices comprises at least one controllable infrared blocking or infrared redirecting element.

In certain embodiments, the plurality of infrared emitting devices comprises infrared light emitting devices arranged in a generally cylindrical shape arranged around the perimeter of the wet extrudate material, wherein the generally cylindrical shape has a hollow interior, and the extrusion system is configured to cause the wet extrudate material to pass through the hollow interior.

In certain embodiments, the at least one sensor comprises at least one first sensor positioned upstream of the at least one first infrared emitting device in a direction of travel of the wet extrudate material, and at least one second sensor arranged between the at least one first infrared emitting device and the at least one second infrared emitting device.

In certain embodiments, the at least one sensor comprises an optical sensor configured to sense a reflectance property or an absorbance property of the exterior surface.

In certain embodiments, the at least one sensor comprises at least one image sensor configured to image one or more portions of the exterior surface, and the at least one sensor further comprises an image analyzer configured to analyze images captured by the at least one image sensor.

In certain embodiments, the at least one sensor comprises at least one temperature sensor configured to detect a temperature of one or more portions of the exterior surface without contacting the exterior surface.

In certain embodiments, the at least one sensor comprises at least one radio frequency sensor configured to quantify moisture content in one or more portions of the wet extrudate material.

In certain embodiments, the wet extrudate material comprises a porous structure, and the extrusion system further comprises a humidification section arranged downstream of the at least one infrared emitting device in the direction of travel of the wet extrudate material, wherein the humidification section is configured to at least partially rehydrate the wet extrudate material to maintain the porous structure in a wetted state.

In certain embodiments, the at least one infrared emitting device is configured to produce infrared emissions having at least one peak emission wavelength and at least one full-width, half-maximum emission wavelength range; the oil comprises an absorption spectrum having at least one peak absorption wavelength and at least one full-width, half-maximum absorption wavelength range; and the at least one full-width, half-maximum emission wavelength range comprises at least one wavelength value within 1 micrometer of a wavelength of the at least one full-width, half-maximum absorption wavelength range of the oil.

In certain embodiments, the at least one infrared emitting device is configured to produce infrared emissions having at least one peak emission wavelength and at least one full-width, half-maximum emission wavelength range; the wet extrudate material comprises a plurality of constituents each having an absorption spectrum having at least one peak absorption wavelength and at least one full-width, half-maximum absorption wavelength range; and the at least one full-width, half-maximum emission wavelength range comprises at least one wavelength value within 1 micrometer of a wavelength of the at least one full-width, half-maximum absorption wavelength range of at least one constituent of the plurality of constituents.

In another aspect, the disclosure relates to an extrudate processing method comprising multiple steps. One step includes forming wet extrudate material comprising a honeycomb cross-section and an exterior surface from an outlet of an extrusion die, the wet extrudate material being susceptible to presence of oil on less than an entirety of the exterior surface. Another step includes sensing a property of the exterior surface utilizing at least one sensor positioned downstream of the outlet and generating at least one sensor output signal indicative of localized presence of oil on the exterior surface. Another step includes, responsive to the at least one sensor output signal, operating at least one infrared emitting device to impinge infrared emissions on at least one portion of the exterior surface to reduce the presence of oil on the exterior surface.

In certain embodiments of the foregoing method, the at least one infrared emitting device comprises at least one controllable infrared blocking or infrared redirecting element, and the operating of the least one infrared emitting device comprises controlling operation of the at least one controllable infrared blocking or infrared redirecting element to selectively impinge infrared emissions on one or more selected areas the exterior surface.

In certain embodiments of the foregoing method, the at least one infrared emitting device comprises a plurality of infrared emitting devices distributed around a perimeter of the wet extrudate material, and the operating of the least one infrared emitting device comprises separately controlling operation of different infrared emitting devices of the plurality of infrared emitting devices to selectively impinge infrared emissions on one or more selected areas of the exterior surface.

In certain embodiments, the sensing of a property of the exterior surface comprises sensing at least one of: absorbance of electromagnetic radiation by the exterior surface, reflectance of electromagnetic radiation by the exterior surface, or temperature of the exterior surface.

In certain embodiments, the sensing of a property of the exterior surface comprises imaging one or more portions of the exterior surface with at least one image sensor, and analyzing images captured by the at least one image sensor.

In certain embodiments, the wet extrudate material comprises a porous structure, and following the impingement of infrared emissions on at least one portion of the exterior surface, the porous structure is at least partially rehydrated to maintain the porous structure in a wetted state.

In yet another aspect, the disclosure relates to an extruded product comprising ceramic (e.g., cordierite) material having a honeycomb cross-section, and produced by an extrudate processing method disclosed herein.

In another aspect, any of the foregoing aspects and/or other features disclosed herein may be combined for additional advantage.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 10 is a plot of transmission (in percent) versus wavelength (in microns) in an infrared range for two types of wet ceramic batch material suitable for extrusion.

FIG. 11 is a plot of absorbance versus wavelength (in microns) in an infrared range for wet ceramic material suitable for forming cordierite, with peaks corresponding to various constituents having constituent labels.

DETAILED DESCRIPTION

Figure 1:
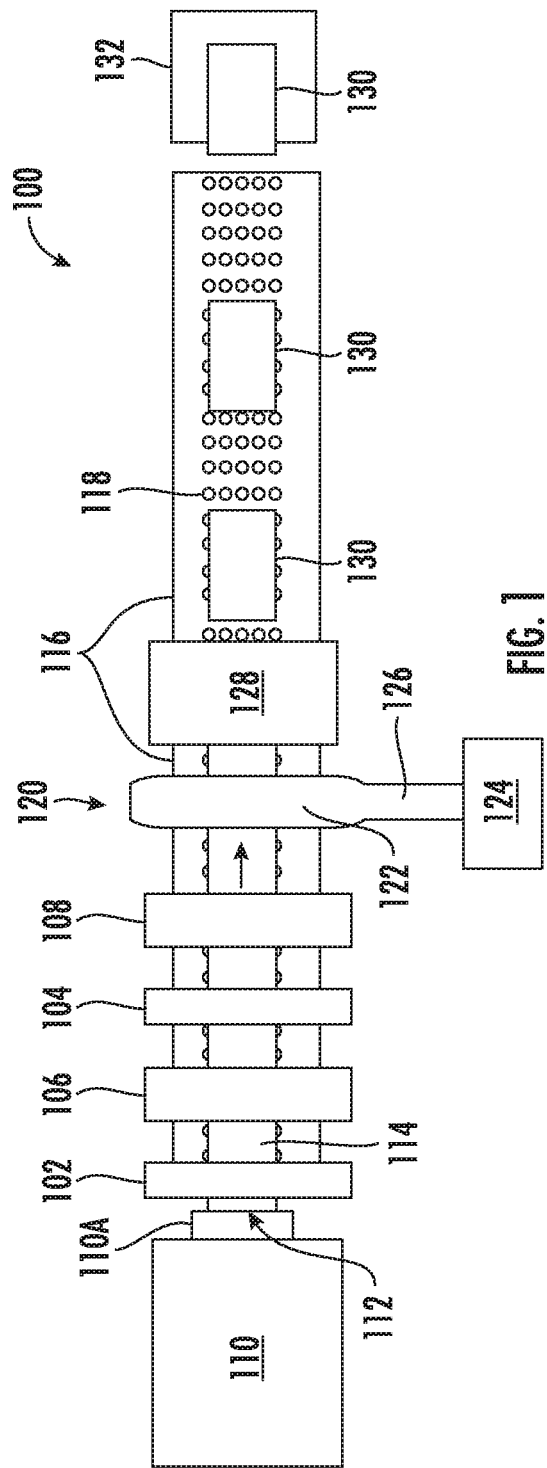
FIG. 1 is a schematic top plan view illustration of an extrusion system including sensors and infrared emitting devices arranged downstream of an extrusion die according to one embodiment.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

Relative terms such as "below" or "above" or "upper" or "lower" or "horizontal" or "vertical" may be used herein to describe a relationship of one element, layer, or region to another element, layer, or region as illustrated in the drawing figures. It will be understood that these terms and those discussed above are intended to encompass different orientations of the device in addition to the orientation depicted in the drawing figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

It has been observed that when wet extrudate sections having oil streaks thereon are fired, fissures (i.e., cracks) may be formed in the exterior skin of the extrudate sections at locations where oil streaks were present, particularly when the exterior skin is relatively thin. Without being bound by theory, such fissures are believed to be formed due to differential drying along the circumference of the skin of an extrudate due to presence of oil streaks, which act as a barrier to drying.

FIG. 1 is a schematic top plan view illustration of an extrusion system 100 including sensors 102, 104 and infrared emitting devices 106, 108 arranged downstream of an extrusion apparatus 110 (which may also be referred to herein as an extruder). The extrusion apparatus 110 includes an extrusion die 110A having an outlet 112 that supplies wet extrudate material 114 to a conveyor apparatus 116 (e.g., a ceramic extrudate carrier that may include an air bearing surface 118 enabling cut extrudate material sections 130 to be translated in a low-friction manner to a dryer tray 132). In certain embodiments, the air bearing surface 118 of the conveyor apparatus 116 may comprise a channel having a semi-circular, semi-ovular, or rectangular shape to guide the wet extrudate material 114 in its path to the dryer tray 132. Each infrared emitting device 106, 108 may embody at least one infrared emitting device or multiple infrared emitting devices. Downstream of the infrared emitting devices 106, 108, the extrusion system 100 further includes an (optional) humidification section 120 that may be used to at least partially rehydrate a porous structure of the wet extrudate material 114 if necessary to preserve a desirably uniform moisture content in the porous structure following impingement of infrared emissions on one or more portions of an exterior surface (also referred to as "skin") of the wet extrudate material 114. If provided, the humidification section 120 may include a flow-through humidification chamber 122 configured to receive humidified air supplied by an air pump 124 and ducting 126. The extrusion system 100 further includes a cutter 128 (e.g., wet saw) configured to separate the wet extrudate material 114 into cut extrudate material sections 130 that are conveyed to the dryer tray 132 for transportation to a kiln (not shown) or other firing apparatus.

The extrusion apparatus 110 is configured to continuously form wet extrudate material 114. The extrusion apparatus 110 may comprise a horizontal extruder that extrudes the wet extrudate material 114 in a horizontal direction. In certain embodiments, the wet extrudate material 114 is a wet ceramic material, and may include constituents such as aluminum titanate, silicon carbide (SiC), mullite, talc, alumina, silica, clays, aluminum hydroxide, or any other suitable ceramic precursor material. In certain embodiments, the wet extrudate material 114 is highly absorptive of emissions in the infrared wavelength range. In certain embodiments, the wet extrudate material 114 includes graphite, which exhibits high absorption of infrared emissions.

The first sensor 102 positioned downstream of the outlet 112 of the extrusion die 110A is configured to detect a condition indicative of localized presence of oil on an exterior surface of the wet extrudate material 114. In certain embodiments, the first sensor 102 includes multiple first sensors distributed to detect conditions present in different locations around a perimeter of the wet extrudate material 114. If multiple first sensors 102 are provided, then in certain embodiments the multiple first sensors 102 have overlapping sensing fields to permit detection of conditions around an entire perimeter of the wet extrudate material 114. Multiple sensors may be distributed around an inner surface of a cavity-defining tubular sensor support member (not shown in FIG. 1, but described hereinafter in connection with FIG. 4) and arranged to sense one or more properties of wet extrudate material passing through the cavity of such a support member. Various types of sensors may be used to detect a condition indicative of localized presence of oil on the skin of wet extrudate material 114. In certain embodiments, the first sensor 102 may include multiple sensors of different types (e.g., different operating principles and/or sensing modalities).

In certain embodiments, the first sensor 102 may include at least one optical sensor, such as an optical reflectance sensor or optical absorbance sensor that rely on sensing of reflectance or absorbance of electromagnetic radiation. Such sensors may impinge light or other emissions on a surface and then detect a proportion of the light or other emissions that are reflected or absorbed by the surface. Since oil streaks present on a skin of the wet extrudate material 114 may interact with light or other wavelengths differently than the remainder of the wet extrudate material 114, optical sensing may be used to detect presence and location of localized oil streaks.

In certain embodiments, the first sensor 102 may include at least one image sensor used to capture images of the skin of wet extrudate material 114, wherein such images may be subject to image processing and/or analysis by at least one image analyzer (e.g., including a processor) to permit automated detection of presence of oil streaks on a skin of the wet extrudate material 114.

Arranged downstream of the first sensor 102 (i.e., in a direction of travel of the wet extrudate material 114 on the conveyor apparatus 116) is at least one first infrared emitting device 106 configured to impinge infrared emissions on one or more locations of a skin of the wet extrudate material 114, preferably at locations corresponding to presence of oil streaks detected by the at least one first sensor 102. In certain embodiments, the at least one first infrared emitting device 106 includes multiple independently controllable infrared emitting devices, which may be distributed around a perimeter (e.g., a circumference) of the wet extrudate material 114 and separately configured to impinge infrared emissions on different circumferential portions of a skin of the wet extrudate material 114. In certain embodiments, the at least one first infrared emitting device 106 has a generally cylindrical shape with a hollow interior, with a group of controllable infrared blocking or infrared redirecting elements arranged in a cavity-defining annular shape (such as described in connection with FIG. 6) positioned in the hollow interior and configured to control passage of infrared emissions from the at least one first infrared emitting device 106 to one or more portions of wet extrudate material 114 passing through the cavity. In certain embodiments, the hollow interior of the at least one first infrared emitting device 106 has an internal diameter of at least about 100 mm, or at least about 150 mm.

The second sensor 104 (e.g., at least one second sensor optionally including multiple second sensors) may be arranged downstream of the first sensor 102. In certain embodiments, the second sensor 104 may be of the same type as the first sensor 102; whereas in certain other embodiments, the second sensor 104 may be of a type that differs from the first sensor 102. In certain embodiments, the second sensor 104 may be used to verify whether any oil streaks on a skin of the wet extrudate material 114 detected by the first sensor 102 have been removed by impingement of infrared emissions of the at least one first infrared emitting device 106 on a skin of the wet extrudate material 114. In certain embodiments, the second sensor 104 may include at least one non-contact temperature sensor (e.g., an infrared image sensor) to detect temperature on one or more portions of the wet extrudate material 114, or at least one non-contact radio frequency (RF) sensor configured to quantify moisture content in one or more portions of the wet extrudate material 114, and/or at least one non-infrared image sensor. If provided, at least one temperature sensor may be used to detect residual localized presence of oil streaks or detect whether treatment by the at least one first infrared emitting device 106 has locally elevated temperature of one or more portions of the wet extrudate material 114. Use of at least one RF sensor configured to quantify moisture content may identify excessive local drying of a skin of the wet extrudate material 114 and therefore a need for rehydration thereof by use of the humidification section 120.

At least one second infrared emitting device 108 is arranged downstream of the second sensor 104 (which is downstream of the at least one first infrared emitting device 106) and configured to impinge infrared emissions on one or more locations of a skin of the wet extrudate material 114 that correspond to locations of any persistent oil streaks detected by the second sensor 104. The at least one second infrared emitting device 108 may be of the same type or a different type as the at least one first infrared emitting device 106 described previously herein.

Thus, in operation of the extrusion system 100, the at least one first infrared emitting device 106 may be operated to locally remove any oil streaks detected on a skin of the wet extrudate material 114 by the first sensor 102. Additionally, the second sensor 104 may be used to verify effectiveness of oil streak removal by the at least one first infrared emitting device 106 and/or detect other desirable properties of the wet extrudate material 114. In certain embodiments, feedback from the second sensor 104 may be used to affect operation of the at least one first infrared emitting device 106, such as radiation intensity, impingement duration, or the like. If persistent oil streaks are detected, then the second infrared emitting device 108 may be operated to locally remove them by impingement of infrared emissions on selected portions of the wet extrudate material 114. If treatment of the wet extrudate material 114 by the first and/or second infrared emitting devices 106, 108 results in inconsistent moisture content in the wet extrudate material 114 as detected by the second sensor 104, then the humidification section 120 (arranged downstream of the at least one second infrared emitting device 108) may be operated to achieve a suitable moisture content in pores of the wet extrudate material 114. In certain embodiments, a controller may be in electronic communication with various elements of the extrusion system 100 (e.g., the sensors 102, 104, the infrared emitting devices 106, 108, the extrusion apparatus 110, the humidification section 120, the conveyor apparatus 116, etc.) to coordinate operation of the extrusion system 100 and/or adjust operating parameters of various elements thereof.

Operation of the cutter 128 (e.g., a wet saw) serves to separate the wet extrudate material 114 into cut extrudate material sections 130 that are conveyed by the conveyor apparatus 116 to the dryer tray 132 for transportation to a kiln or other drying apparatus (not shown) for firing.

Figure 2A:
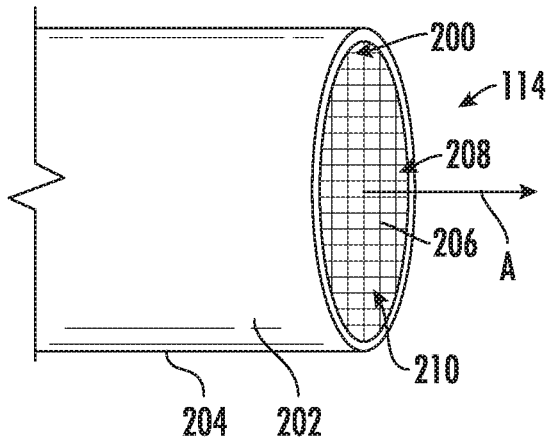
FIG. 2A is a perspective view of a wet extrudate material formed from the extrusion system of FIG. 1.
Figure 2B:
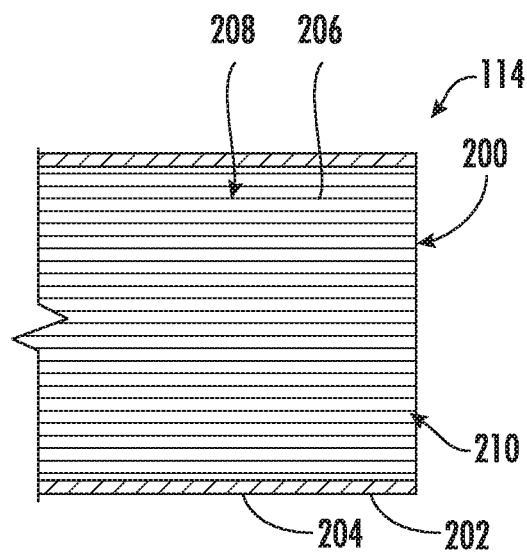
FIG. 2B is a side cross-sectional view of the wet extrudate material of FIG. 2A.
Figure 2C:
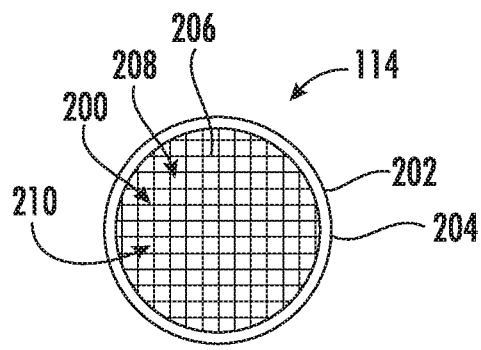
FIG. 2C is an end elevational view of the wet extrudate material of FIG. 2A.

FIGS. 2A-2C are views of the wet extrudate material 114 formed from the extrusion system 100 of FIG. 1. The wet extrudate material 114 has a first end 200 (e.g., front end), as well as a peripheral wall 202 having an external surface 204 (i.e., skin) and a plurality of interior walls 206 that intersect within the peripheral wall 202. The interior walls 206 form mutually adjoining cell channels 208 that extending axially in direction "A" from the first end 200. Restated, in certain embodiments, the wet extrudate material 114 has a honeycomb cross-section 210 bounded by the peripheral wall 202. The wet extrudate material 114 may have a diameter of any size, including comparatively large sizes (e.g., diameters of 4 inches (101.6 mm), 6 inches (152.8 mm), or greater).

Figure 3:
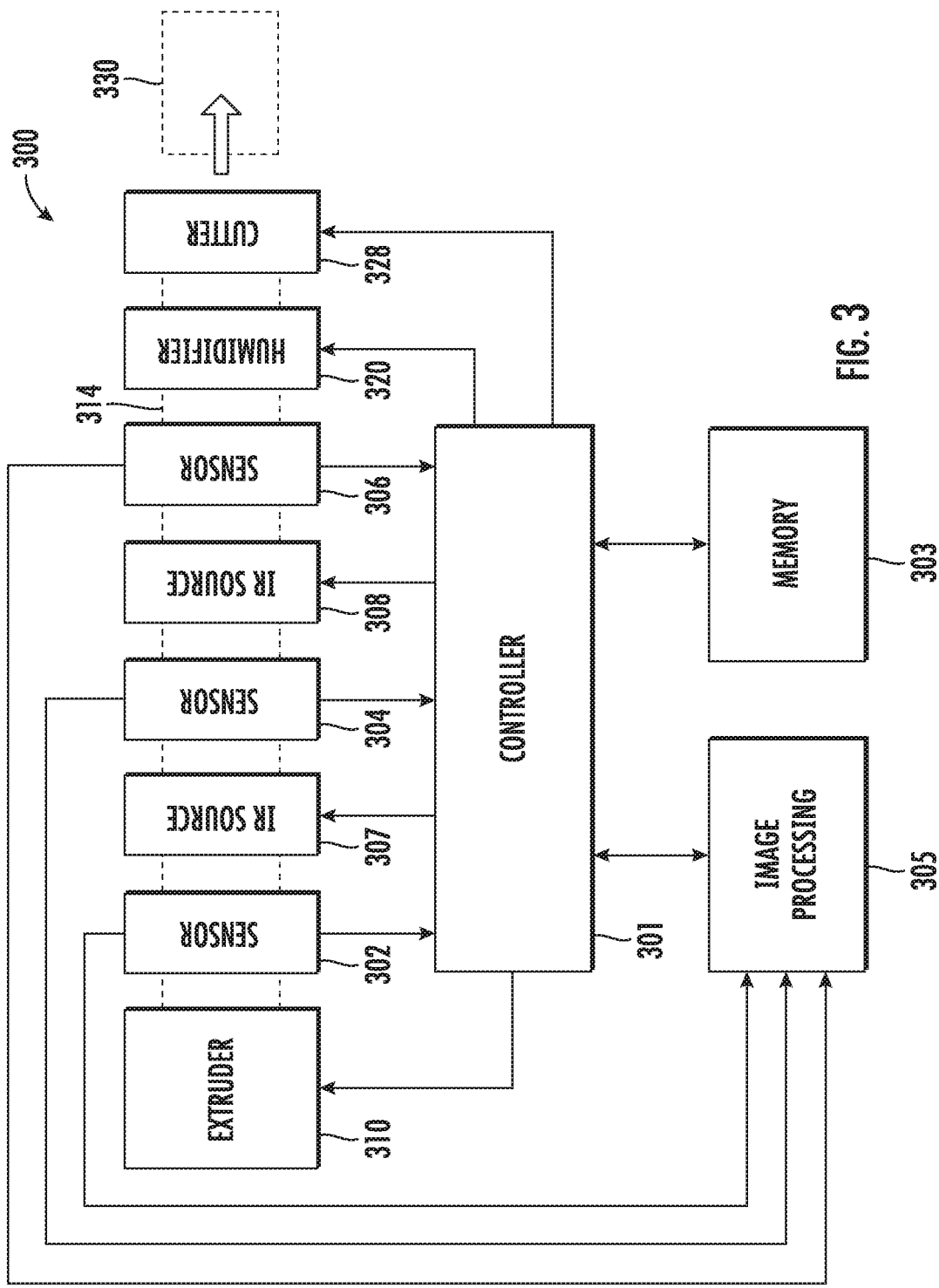
FIG. 3 is a schematic diagram showing interconnections between components of an extrusion system including sensors and infrared emitting devices arranged downstream of an extruder.

FIG. 3 is a schematic diagram showing interconnections between components of an extrusion system 300 (similar to the extrusion system 100 described in connection with FIG. 1) including sensors 302, 304, 306 and infrared emitting devices 307, 308 arranged downstream of an extruder 310. The extrusion system 300 causes wet extrudate material 314 produced by the extruder 310 to travel past or through at least one first sensor 302, at least one first infrared emitting device 307, at least one second sensor 304, at least one second infrared emitting device 308, at least one third sensor 306, a humidification section 320, and a cutting apparatus 328 that may be sequentially arranged proximate to a conveyor apparatus (not shown), with the cutting apparatus 328 used to segregate wet extrudate material 314 originally formed as a continuous log into cut sections of wet extrudate material 330. Each of the preceding components may is coupled with a controller 301 (e.g., including a processor configured to execute a machine-readable instruction set that may be embodied in software or firmware) to coordinate signals received from the sensors 302, 304, 306 and control operation of the extruder 310, infrared emitting devices 307, 308, the humidification section 320, and the cutting apparatus 328. A memory 303 associated with the controller 301 may be used to store operating instructions, log operational data, and the like. If one or more of the sensors 302, 304, 306 includes an image sensor, then an image processing unit 305 (or image analyzer) may be provided to analyze images captured by the at least one image sensor 302, 304, 306 (e.g., to identify presence and location of oil streaks on an exterior surface of the wet extrudate material 314) and supply information to the controller 301 to facilitate control of the infrared emitting devices 307, 308.

Figure 4:
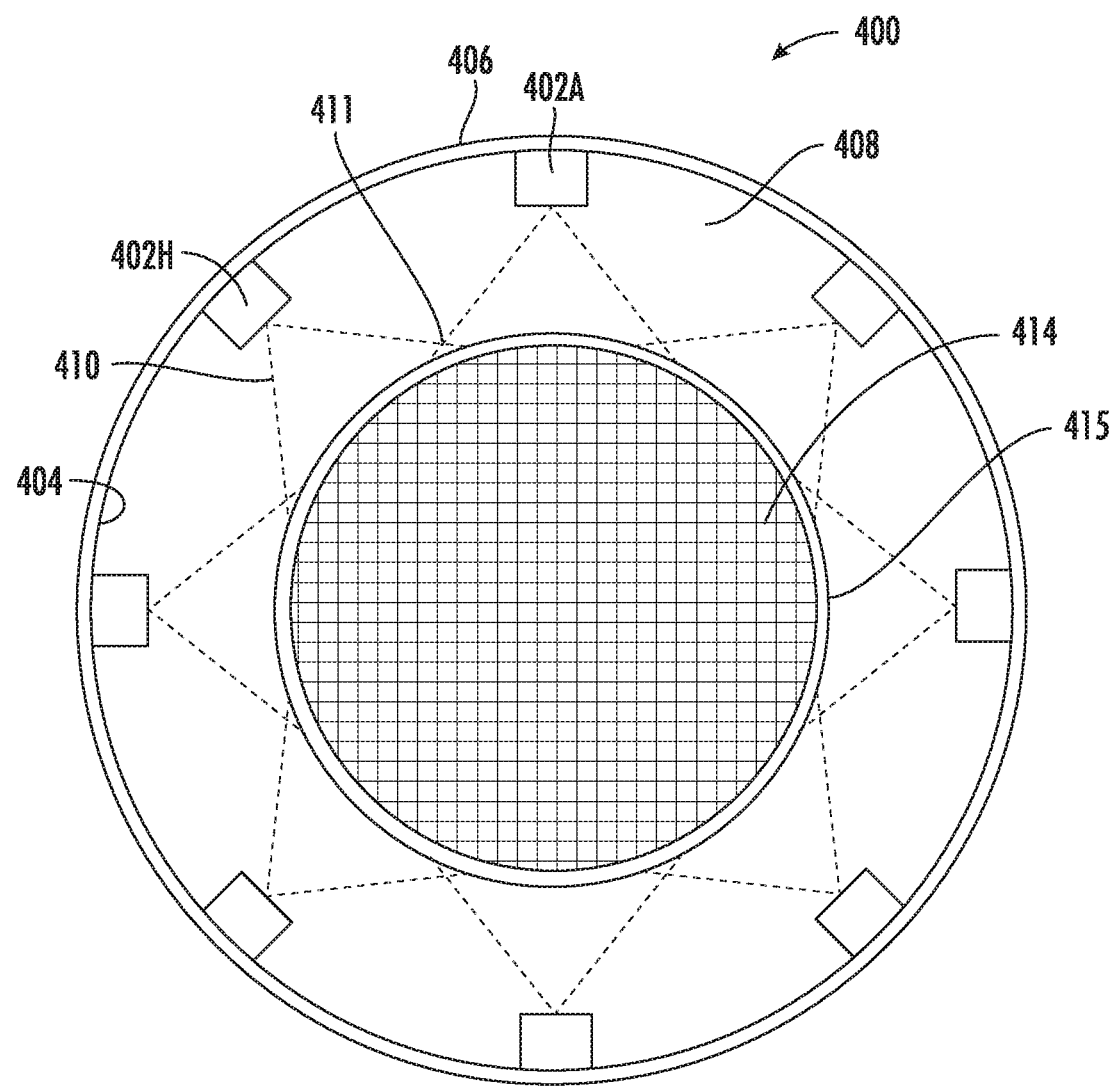
FIG. 4 is a schematic cross-sectional view of a sensor apparatus including a group of sensors distributed around an inner surface of a cavity-defining tubular sensor support member and arranged to sense one or more properties of wet extrudate material passing through the cavity.

FIG. 4 is a schematic cross-sectional view of a sensor apparatus 400 including a group of sensors 402A-402H distributed around an inner surface 404 of a tubular sensor support member 406 defining a cavity 408, with wet extrudate material 414 positioned within the cavity 408 (e.g., and subject to travel in a direction out of the drawing page). Each sensor 402A-402H has a sensing field 410, with sensing fields 410 for adjacent sensors 402A, 402H preferably overlapping (e.g., at an overlap region 411) to ensure that an entire perimeter (e.g., circumference) of an exterior surface 415 of the wet extrudate material 414 may be sensed. Although eight sensors 402A-402H are depicted in FIG. 4, it is to be appreciated that sensor apparatuses according to various embodiments may include any suitable number of sensors, such as one, two, three, four, six, eight, ten, twelve, or more. The sensors 402A-402H may be of any type disclosed herein or known to those skilled in the art, preferably arranged in a non-contacting relationship relative to the wet extrudate material 414. In certain embodiments, the group of sensors 402A-402H may include sensors of different types and/or operating modalities.

Figure 5:
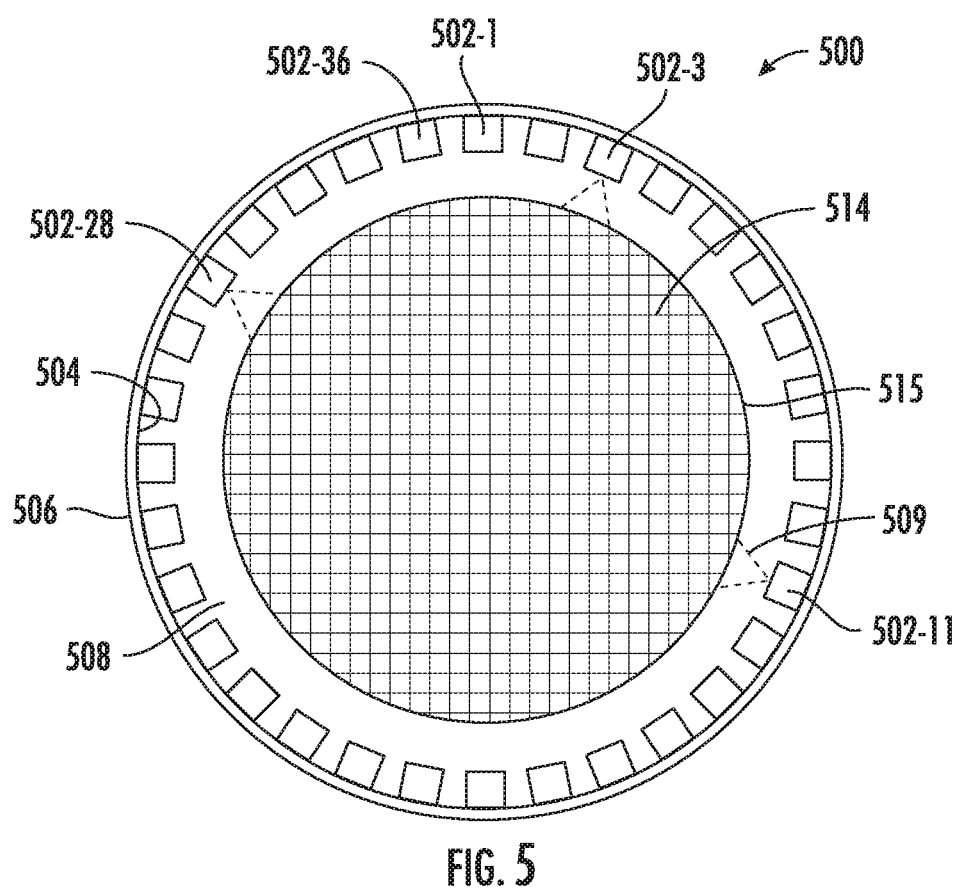
FIG. 5 is a schematic cross-sectional view of an infrared emitting apparatus including a group of infrared emitting devices distributed around an inner surface of a cavity-defining tubular emitter support member and configured to selectively impinge infrared emissions on one or more portions of wet extrudate material passing through the cavity.

FIG. 5 is a schematic cross-sectional view of an infrared emitting apparatus 500 including a group of infrared emitting devices 502-1 to 502-36 (collectively, 502) distributed around an inner surface 504 of a tubular emitter support member 506 that defines a cavity 508. The infrared emitting devices 502-1 to 502-36 are separately controllable to permit infrared emissions to be selectively impinged on one or more different portions of an exterior surface 515 of wet extrudate material 514 passing through the cavity 508. In certain embodiments, the infrared emitting devices 502 may comprise infrared emitters such as light emitting diodes (LEDs) or laser diodes. Although thirty-six infrared emitting devices 502 are depicted in FIG. 5, it is to be appreciated that infrared emitting apparatuses according to various embodiments may include any suitable number of infrared emitting devices 502. FIG. 5 depicts three individual infrared emitting devices 502-3, 502-11, 502-28 in a state of impinging infrared emissions 509 on the exterior surface 515 of the wet extrudate material 514, such as may be triggered responsive to detection of oil streaks on the exterior surface 515 the wet extrudate material 514 using one or more sensors as described previously herein.

In certain embodiments, the infrared emitting devices 502 may include one or more infrared emitting sources and a plurality of optical waveguides (e.g., prisms, light guides, optical fibers, etc.) configured to transmit infrared emissions to direct infrared emissions to different portions of the exterior surface 505 of the wet extrudate material 514. In certain embodiments, each infrared emitting device 502 may include a single infrared emitting source and at least one waveguide. In certain embodiments, each infrared emitting device 502 includes at least one waveguide, wherein waveguides for different infrared emitting devices 502 may be coupled to single infrared emitting source.

Figure 6:
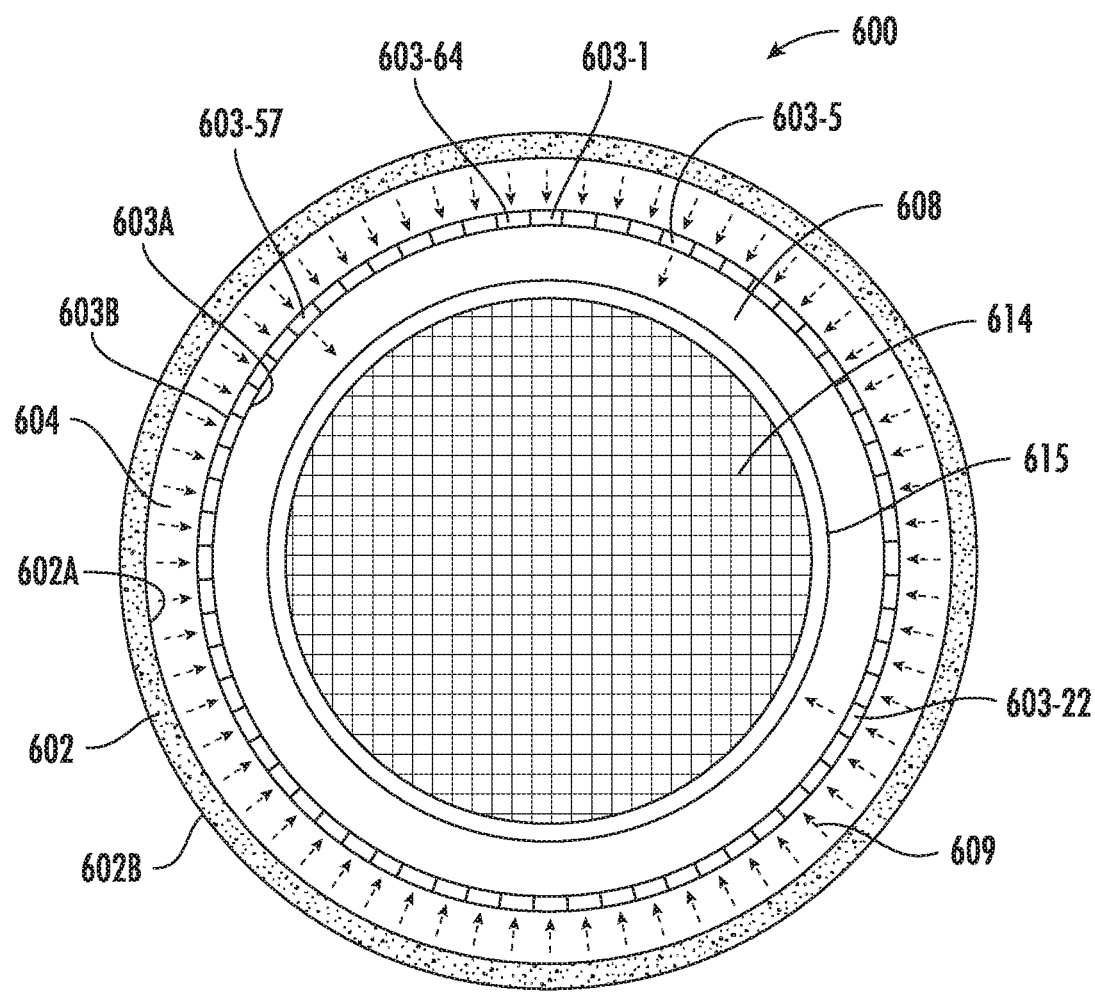
FIG. 6 is a schematic cross-sectional view of an infrared emitting apparatus having a generally cylindrical shape with a hollow interior, with a group of controllable infrared blocking or infrared redirecting elements arranged in a cavity-defining annular shape positioned in the hollow interior of an infrared emitting device and configured to control passage of infrared emissions between the infrared emitting device and one or more portions of wet extrudate material passing through the cavity.

FIG. 6 is a schematic cross-sectional view of an infrared emitting apparatus 600 including an infrared emitting device 602 having a generally cylindrical shape with a hollow interior 604. The infrared emitting device 602 may be embodied in a blackbody-type lamp configured to generate infrared emissions. The infrared emitting device 602 may include an infrared-transmissive inner surface 602A and a reflective exterior surface 602B. A group of controllable infrared blocking or infrared redirecting elements 603-1 to 603-64 (collectively 603) arranged in an annular shape is positioned in the hollow interior 604 of the infrared emitting device 602 and configured to control passage of infrared emissions 609 between the infrared emitting device 602 and one or more portions of an exterior surface 615 of wet extrudate material 614 passing through a cavity 608. Each controllable infrared blocking or infrared redirecting element 603 includes an inner surface 603A and an exterior surface 603B, with the exterior surface 603B facing the infrared emitting device 602. In certain embodiments, controllable infrared blocking elements 603 are provided, such as may be embodied in liquid crystal elements, piezoelectrically controlled shutters, or the like. In certain embodiments, controllable infrared redirecting elements 603 are provided, such as steering mirrors that may be piezoelectrically actuated or actuated in a like manner to conventional digital light processing (DLP) chips. FIG. 6 depicts three individual controllable infrared blocking elements or infrared redirecting elements 603-5, 603-22, 603-57 each in a state of allowing transmission of infrared emissions 609 generated by the infrared emitting device 602, with the remaining infrared redirecting elements 603 not permitting transmission of infrared emissions therethrough. The selective transmission of infrared emissions through individual controllable infrared blocking elements or infrared redirecting elements 603-5, 603-22, 603-57 to impinge on the exterior surface 615 of the wet extrudate material 614 may be triggered responsive to detection of oil streaks on the exterior surface 615 the wet extrudate material 614 using one or more sensors as described previously herein.

In certain embodiments, the infrared emitting device 602 may embody a ring-shaped resistive heater. By varying the current supplied to the resistive heater, the emission peak wavelength can be tuned to maximize heating efficiency. According to Wien's displacement law, the peak emission wavelength is given by $\lambda = b/T$, where 'b' is Wien's constant, and 'T' is the absolute temperature in Kelvin. Changing current into the resistive heater will result in changes in heater power and thus shift the maximum emission wavelength. A resistive heating element can be made, for example, of SiC, iron-chromium-aluminum (FeCrAl) wire (e.g., Kanthal® resistance wire commercially available from Sandvik A B, Hallstahammar, Sweden), or other materials known in the art. Heater designs may be based on extrusion speed, skin thickness, diameter of the wet extrudate material, etc. Heating power can be increased by increasing the size of the heating element (surface emission area), and uniform heating on the exterior surface 615 of the wet extrudate material 614 exterior can be achieved using a coiled filament design or other configurations known in the art.

Figure 7A:
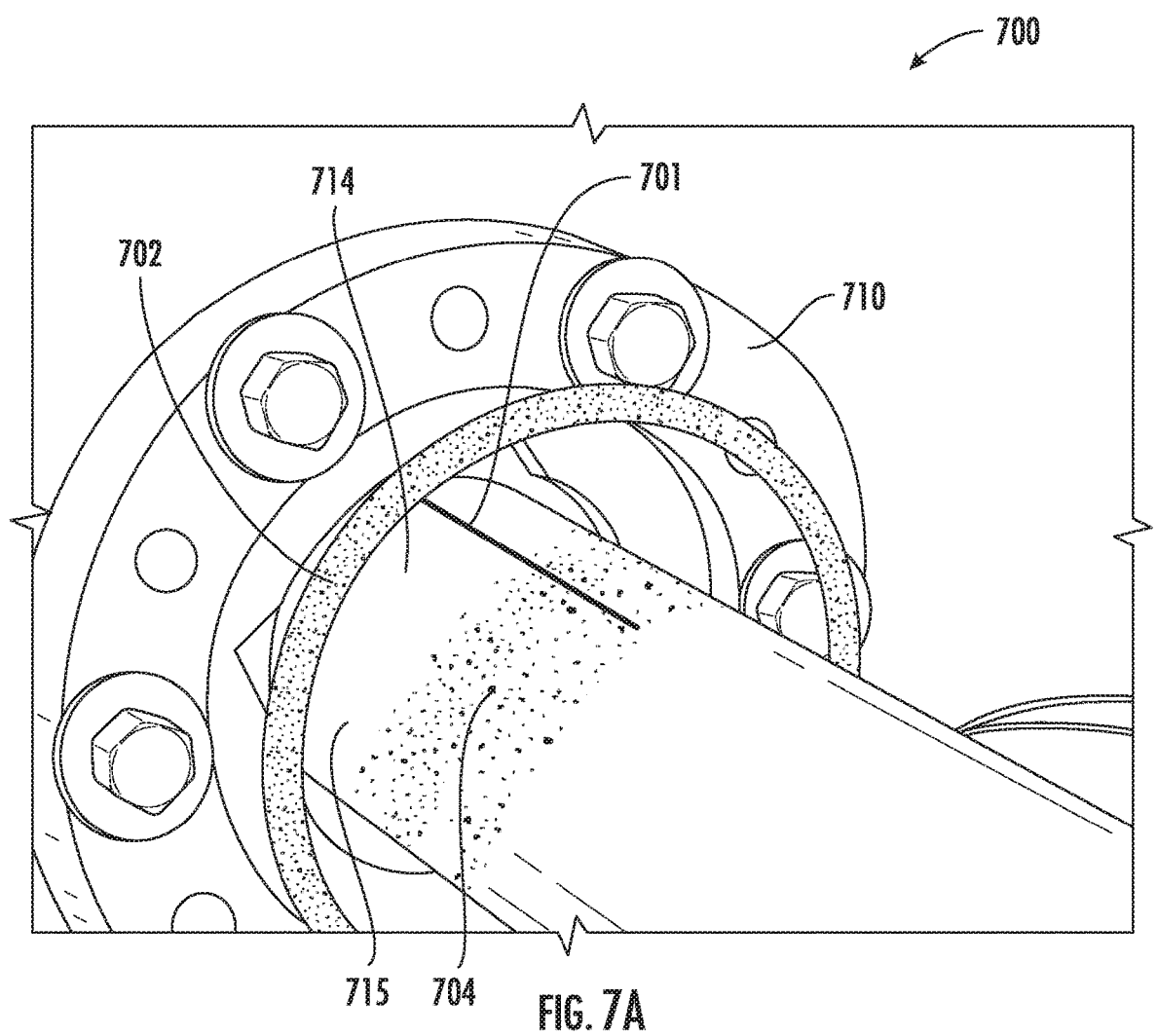
FIG. 7A is a perspective view illustration of an experimental setup used to demonstrate removal of an oil streak from the skin of wet extrudate received from an extruder, by impingement of infrared emissions around an entire circumferential portion of the wet extrudate material using an infrared emitting device having a generally cylindrical shape.
Figure 7B:
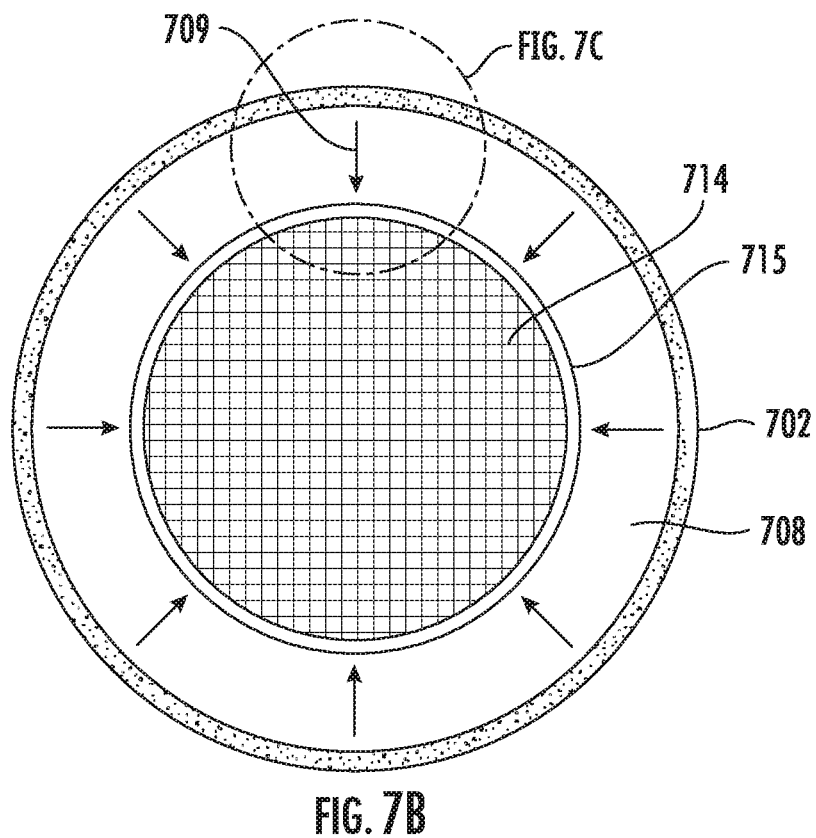
FIG. 7B is a schematic cross-sectional view of the infrared emitting device and wet extrudate of the experimental setup of FIG. 7A.
Figure 7C:
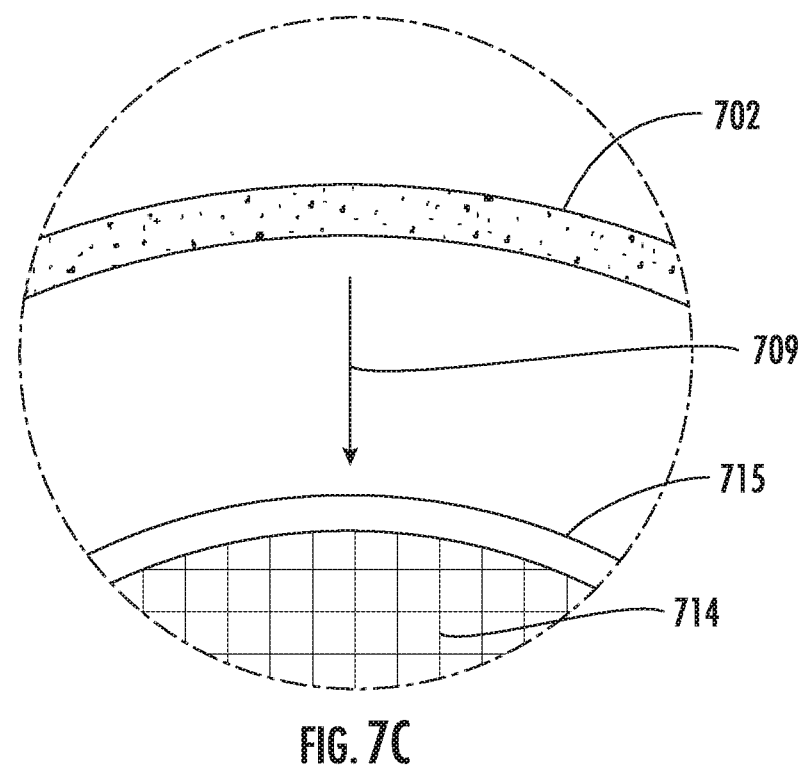
FIG. 7C provides a magnified portion of FIG. 7B.

FIGS. 7A-7C illustrate an experimental setup 700 used to demonstrate successful removal of an oil streak 701 from an exterior surface 715 of ceramic wet extrudate material 714 received from an extruder 710, by impingement of infrared emissions around an entire circumferential portion of the wet extrudate material 714 using an infrared emitting device 702 arranged in truncated cylindrical shape (e.g., a ring shape). To demonstrate proof of the concept, a 2.2 kW blackbody-type infrared emitting device 702 (i.e., a lamp) was used to impinge infrared emissions in an irradiation zone 704 around an entire circumferential perimeter of the exterior surface 715 of the wet extrudate material 714. Peak infrared emissions were at a wavelength of 1.4 microns. The wet extrudate material 714 passes through a cavity 708 defined by the infrared emitting device 702. A central axis of the infrared emitting device 702 is substantially aligned with a central axis of an outlet of the extruder 710. As shown, impingement of infrared emissions 709 (depicted by arrows in FIGS. 7B-7C) on the exterior surface 715 of the wet extrudate material 714 was sufficient to effectuate removal of the oil streak 701 (shown in FIG. 7A), which did not progress past the irradiation zone 704.

Figure 8:
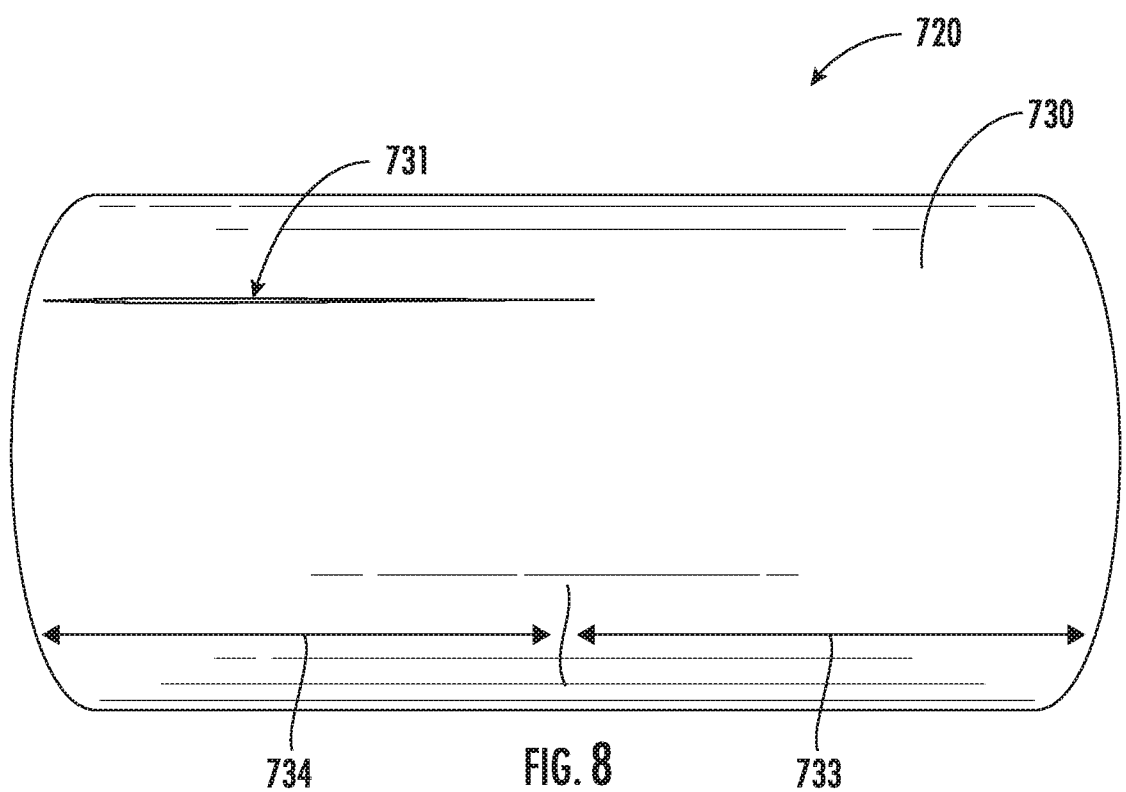
FIG. 8 is a side elevational view illustration of a fired ceramic extrudate material section including a first uncracked portion treated with infrared emissions using the experimental setup of FIG. 7A, and including a second portion not treated with infrared emissions in which a surface crack or fissure is present.

FIG. 8 is a side elevational view illustration of a fired ceramic extrudate material section 720 including a first portion 733 treated with infrared emissions using the experimental setup 700 of FIG. 7A and being free of cracks, and including a second portion 734 not treated with infrared emissions and exhibiting a crack or fissure 731 extending into an exterior surface 730 of the fired ceramic extrudate material section 720. This demonstrates the benefit of removing oil streaks with infrared emissions prior to firing of wet ceramic extrudate material using systems and methods disclosed herein, to avoid formation of cracks in surfaces of fired ceramic bodies such as cordierite and other ceramics.

Figure 9A:
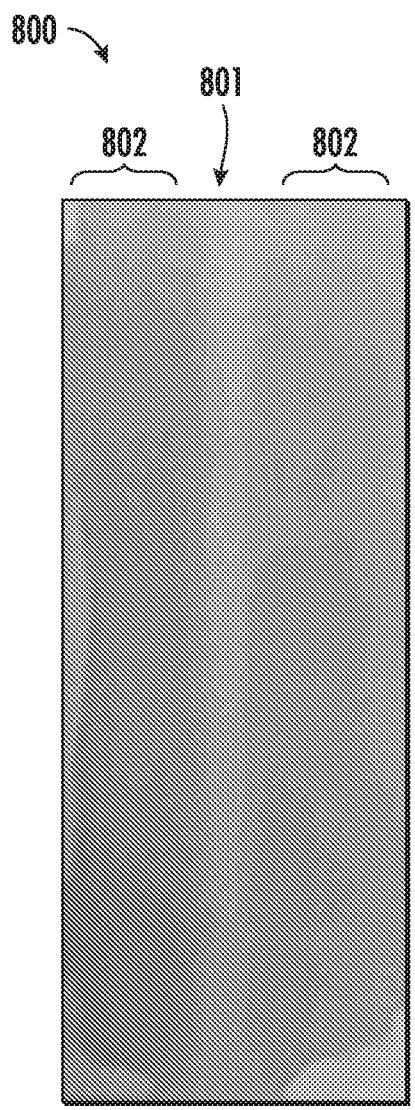
FIG. 9A is a photograph of an oil-coated strip of wet ceramic extrudate material following impingement of laser emissions on a central portion thereof, exhibiting removal of oil from laser-treated areas.
Figure 9B:
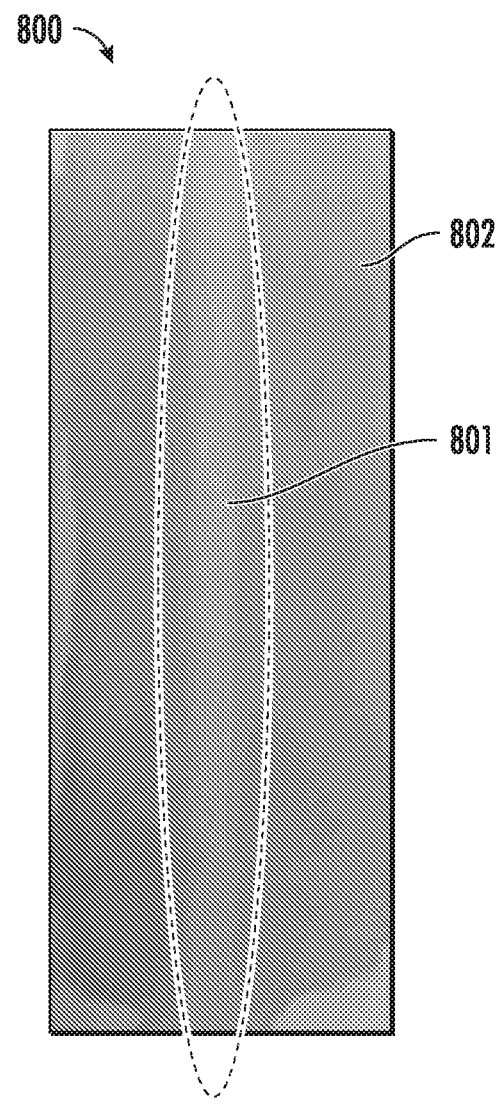
FIG. 9B is an annotated version of the photograph of FIG. 9A, following addition of an elongated oval shape around the laser-treated area of the oil-coated strip.

To further test feasibility of the proposed treatment of wet extrudate material with infrared emissions, wet ceramic batch material suitable for forming cordierite was rolled into rectangular strips of about 762 micron (30 mil) thickness. Oil was applied to the surface and the oil-coated ceramic batch material samples were translated linearly at 5.08 cm (2 inches) per second under a 12 mm diameter $CO_2$ laser spot with 50 W power. FIG. 9A is a photograph of an oil-coated strip of wet ceramic batch material 800 following impingement of laser emissions on a central portion 801 thereof, exhibiting removal of oil from laser-treated areas, while oil remained on untreated areas 802. FIG. 9B is an annotated version of the photograph of FIG. 9A, following addition of an elongated oval shape around the laser-treated central portion 801 of the oil-coated strip. By evidencing the removal of oil in the central portion 801, FIGS. 9A and 9B show the feasibility of cleaning oil films from surfaces of wet ceramic substrates using infrared energy. In another similar experiment, feasibility of using a 976 nm laser diode was shown; however, $CO_2$ laser emissions couples better with oil and/or wet extrudate material than 976 nm laser emissions.

FIG. 10 is a plot of transmission (in percent) versus wavelength (in microns) in an infrared range for two types of wet ceramic material suitable for extrusion, namely: (1) wet ceramic material suitable for forming cordierite and having an average particle size of 180 microns, and (2) wet ceramic material suitable for forming cordierite with added graphite and having an average particle size of 70 microns. Since transmission is the inverse of absorption, the low percent transmission values shown in FIG. 10 correspond to very high absorbance values in the infrared range. This demonstrates that wet ceramic material exhibits very strong absorption of infrared wavelengths.

FIG. 11 is a plot of absorbance versus wavelength (in microns) in an infrared range for wet ceramic batch material measured using an attenuated total reflectance (ATR) optical measurement method, with labeled absorption bands (or peaks) corresponding to various constituents (i.e., O—H, C—H, H$_2$O, and inorganic oxides). The band near 3 μm is due to OH bonds in the wet batch material. The band near 6 μm is due to H$_2$O in the wet batch material. The band near 10 μm is due to inorganic oxides in the wet batch material. Peak wavelengths shown in FIG. 11 exhibit effective coupling with wet ceramic batch material. As illustrated, there is wavelength sensitivity to energy coupling. Coupling with the band near 3 μm may be better suited to control depth penetration (e.g., compared to coupling with the band near 10 μm), because the peak is smaller and does not absorb as well, so that radiation impinged on the wet ceramic material may penetrate more deeply.

Figure 12:
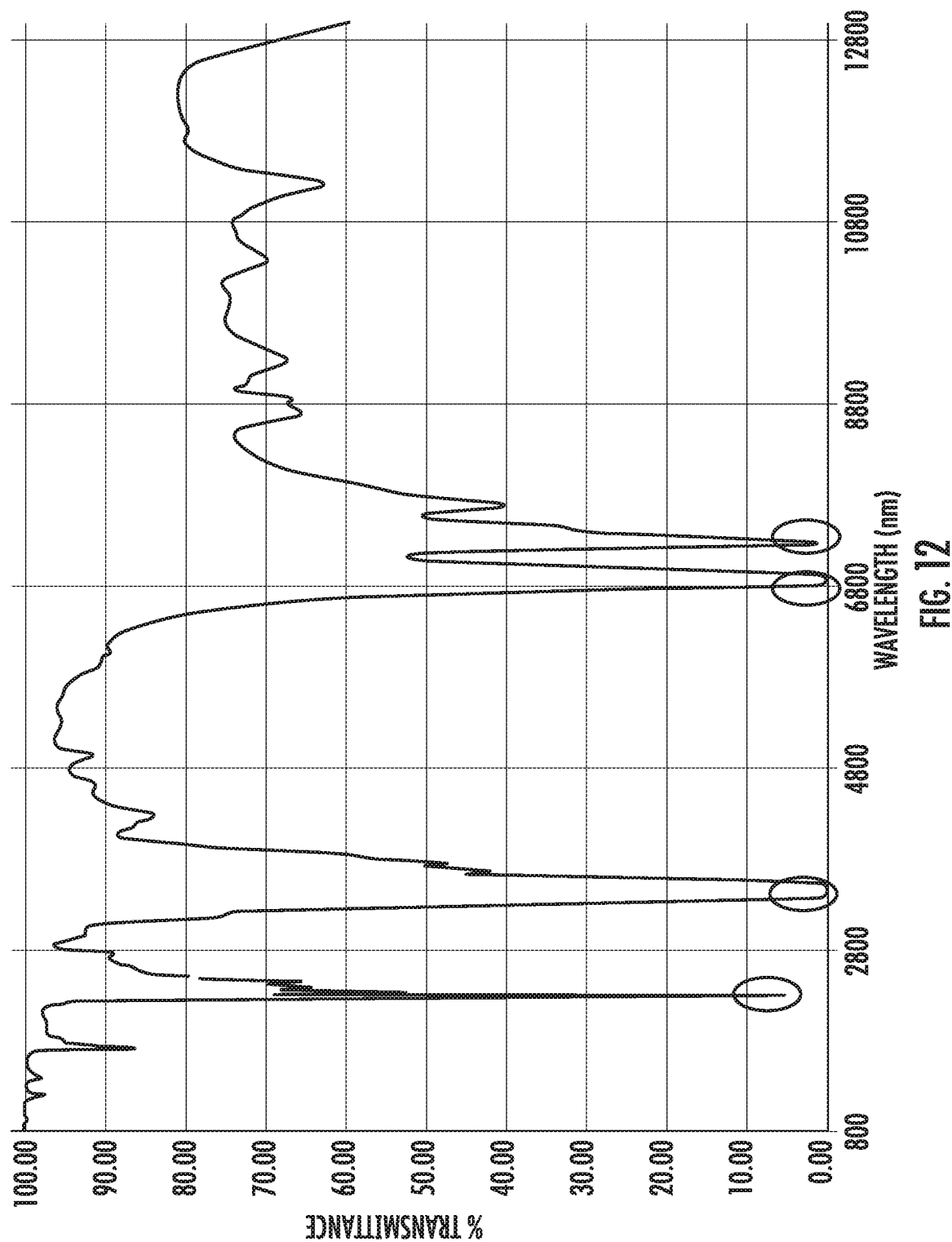
FIG. 12 is a plot of transmittance (in percent) versus wavelength (in nanometers) in an infrared range for Durasyn 162 polyalphraolefin oil.

FIG. 12 is a plot of transmittance (in percent) versus wavelength (in nanometers) in an infrared range for Durasyn 162 polyalphraolefin oil. The four circled regions toward the bottom of the graph denote wavelength ranges where infrared energy couples effectively with an oil film.

Based on FIGS. 11 and 12, it is possible to remove oil films from the exterior surface of wet ceramic extrudate employing either of the following two mechanisms: (i) water vapor-assisted removal, or (ii) volatilization-based removal.

Water vapor-assisted removal uses an infrared wavelength that is absorbed by the wet skin of extrudate material, and that is fairly transparent to the oil. For such purpose, almost any wavelength in the infrared regime would work; however, some wavelengths such as 10.6 μm would be more efficient than 1 μm, with either of the foregoing wavelengths being producible by CO$_2$ lasers. The infrared emissions would heat up the wet skin, allowing the release of water vapor that would remove oil film. In this scenario, the stiffening of wet skin of the wet extrudate may be a favorable byproduct to facilitate material handling without undue deformation. Since infrared radiation absorption is not wavelength sensitive, there is no need to use narrow-wavelength-band emitters such as lasers; instead, high powered infrared lamps with appropriate output wavelength ranges could be used.

Volatilization-based removal uses an infrared wavelength that is strongly absorbed by oil present on an extrudate surface. In certain embodiments, a laser having a peak wavelength of 3 μm subject to strong absorption by an oil film may be used, operating a power level sufficient to volatilize an oil streak without affecting moisture content of the extrudate skin underneath the oil streak.

Rapid volatilization of oil is desirable to prevent development of differential drying stresses in extrudate material. Use of a laser that can deposit a large amount of energy over a small time (e.g., 1.32 KW deposited over a width of 11 mm for 1.25 seconds) fulfills the foregoing requirement.

In certain embodiments, at least one infrared emitting device may be configured to generate a peak emission wavelength based on a peak absorption wavelength, corresponding to infrared absorption of wet extrudate material. The peak absorption wavelength of a particular wet extrudate material may be determined by optical property measurements of the wet extrudate material. In certain embodiments, at least one infrared emitting device is configured to produce infrared emissions having at least one peak emission wavelength and at least one full-width, half-maximum emission wavelength range. Oil present in wet extrudate material comprises an absorption spectrum having at least one peak absorption wavelength and at least one full-width, half-maximum absorption wavelength range. In certain embodiment, the at least one full-width, half-maximum emission wavelength range comprises at least one wavelength value within 1 micrometer of a wavelength of the at least one full-width, half-maximum absorption wavelength range of the oil. This near-overlap between infrared emission wavelength and oil absorption wavelength promotes efficient absorption of infrared emissions, and reduces the likelihood that infrared emissions will result in undue drying of wet extrudate material.

Methods for processing extrudate material have been disclosed herein. It is to be appreciated that the present disclosure encompasses an extruded product comprising cordierite material having a honeycomb cross-section, and produced by an extrudate processing method disclosed herein.

Technical benefits that may be provided by embodiments of the present disclosure include one or more of the following: reducing formation of cracks in fired ceramic bodies (thereby reducing scrap rates and reducing manufacturing costs); avoiding surface defects that may be produced by contact methods for absorbing oil streaks from extrudate surfaces; enabling extrudate material having increased oil content to be used (thereby improving feed rate and reducing wear on extrusion components); an accommodating variations in extrudate manufacturing parameters (e.g., batch composition, environmental conditions, etc.).

It will be apparent to those skilled in the art that various modifications and variations can be made without departing from the spirit or scope of the invention.

Many modifications and other embodiments of the embodiments set forth herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:

1. An extrusion system, comprising:
   an extrusion die comprising an outlet and configured to continuously form wet extrudate material comprising a honeycomb cross-section and an exterior surface, with the exterior surface having oil on less than an entirety of the exterior surface;
   at least one sensor configured to sense a property of the exterior surface indicative of localized presence of oil on the exterior surface, and configured to generate at least one sensor output signal; and
   at least one infrared emitting device positioned downstream of the outlet in a direction of travel of the wet extrudate material, and configured to impinge infrared emissions on at least one portion of the exterior surface;
   wherein the at least one infrared emitting device is configured to be operated responsive to the at least one sensor output signal to reduce presence of oil on the exterior surface.

2. The extrusion system of claim 1, wherein the at least one infrared emitting device comprises at least one first infrared emitting device and at least one second infrared emitting device, wherein the at least one second infrared emitting device is positioned downstream of the at least one first infrared emitting device in the direction of travel of the wet extrudate material.

3. The extrusion system of claim 1, wherein the at least one infrared emitting device comprises a plurality of infrared emitting devices distributed around a perimeter of the wet extrudate material.

4. The extrusion system of claim 3, wherein the plurality of infrared emitting devices comprises multiple independently controllable infrared emitting devices.

5. The extrusion system of claim 3, wherein each infrared emitting device of the plurality of infrared emitting devices comprises an infrared emitting source and a plurality of optical waveguides configured to transmit infrared emissions from the infrared emitting source toward the exterior surface.

6. The extrusion system of claim 3, wherein the plurality of infrared emitting devices comprises at least one controllable infrared blocking or infrared redirecting element.

7. The extrusion system of claim 3, wherein:
the plurality of infrared emitting devices comprises infrared light emitting devices arranged in a generally cylindrical shape arranged around the perimeter of the wet extrudate material, the generally cylindrical shape having a hollow interior; and
the extrusion system is configured to cause the wet extrudate material to pass through the hollow interior.

8. The extrusion system of claim 2, wherein the at least one sensor comprises at least one first sensor positioned upstream of the at least one first infrared emitting device in the direction of travel of the wet extrudate material, and at least one second sensor arranged between the at least one first infrared emitting device and the at least one second infrared emitting device.

9. The extrusion system of claim 1, wherein the at least one sensor comprises an optical sensor configured to sense a reflectance property or an absorbance property of the exterior surface.

10. The extrusion system of claim 1, wherein the at least one sensor comprises at least one image sensor configured to image one or more portions of the exterior surface, and the at least one sensor further comprises an image analyzer configured to analyze images captured by the at least one image sensor.

11. The extrusion system of claim 1, wherein the at least one sensor comprises at least one temperature sensor configured to detect a temperature of one or more portions of the exterior surface without contacting the exterior surface.

12. The extrusion system of claim 1, wherein the at least one sensor comprises at least one radio frequency sensor configured to quantify moisture content in one or more portions of the wet extrudate material.

13. The extrusion system of claim 1, wherein:
the wet extrudate material comprises a porous structure; and
the extrusion system further comprises a humidification section arranged downstream of the at least one infrared emitting device in the direction of travel of the wet extrudate material, and configured to at least partially rehydrate the wet extrudate material to maintain the porous structure in a wetted state.

14. The extrusion system of claim 1, wherein:
the at least one infrared emitting device is configured to produce infrared emissions having at least one peak emission wavelength and at least one full-width, half-maximum emission wavelength range;
the oil comprises an absorption spectrum having at least one peak absorption wavelength and at least one full-width, half-maximum absorption wavelength range; and
the at least one full-width, half-maximum emission wavelength range comprises at least one wavelength value within 1 micrometer of a wavelength of the at least one full-width, half-maximum absorption wavelength range of the oil.

15. The extrusion system of claim 1, wherein:
the at least one infrared emitting device is configured to produce infrared emissions having at least one peak emission wavelength and at least one full-width, half-maximum emission wavelength range;
the wet extrudate material comprises a plurality of constituents each having an absorption spectrum having at least one peak absorption wavelength and at least one full-width, half-maximum absorption wavelength range; and
the at least one full-width, half-maximum emission wavelength range comprises at least one wavelength value within 1 micrometer of a wavelength of the at least one full-width, half-maximum absorption wavelength range of at least one constituent of the plurality of constituents.

16. An extrudate processing method, comprising:
forming wet extrudate material comprising a honeycomb cross-section and an exterior surface from an outlet of an extrusion die, the wet extrudate material being susceptible to presence of oil on less than an entirety of the exterior surface;
sensing a property of the exterior surface utilizing at least one sensor positioned downstream of the outlet and generating at least one sensor output signal indicative of localized presence of oil on the exterior surface; and
responsive to the at least one sensor output signal, operating at least one infrared emitting device to impinge infrared emissions on at least one portion of the exterior surface to reduce the presence of oil on the exterior surface.

17. The extrudate processing method of claim 16, wherein the at least one infrared emitting device comprises at least one controllable infrared blocking or infrared redirecting element, and the operating of the least one infrared emitting device comprises controlling operation of the at least one controllable infrared blocking or infrared redirecting element to selectively impinge infrared emissions on one or more selected areas the exterior surface.

18. The extrudate processing method of claim 16, wherein the at least one infrared emitting device comprises a plurality of infrared emitting devices distributed around a perimeter of the wet extrudate material, and the operating of the least one infrared emitting device comprises separately controlling operation of different infrared emitting devices of the plurality of infrared emitting devices to selectively impinge infrared emissions on one or more selected areas of the exterior surface.

19. The extrudate processing method of claim 16, wherein the sensing of a property of the exterior surface comprises sensing at least one of: absorbance of electromagnetic radiation by the exterior surface, reflectance of electromagnetic radiation by the exterior surface, or temperature of the exterior surface.

20. The extrudate processing method of claim 16, wherein the sensing of a property of the exterior surface comprises imaging one or more portions of the exterior surface with at least one image sensor, and analyzing images captured by the at least one image sensor.

21. The extrudate processing method of claim 16, wherein the wet extrudate material comprises a porous structure, and following the impingement of infrared emissions on at least one portion of the exterior surface, the porous structure is at least partially rehydrated to maintain the porous structure in a wetted state.

* * * * *